US012198612B1

(12) United States Patent
He et al.

(10) Patent No.: US 12,198,612 B1
(45) Date of Patent: Jan. 14, 2025

(54) MICRO LIGHT EMITTING DIODE DISPLAY

(71) Applicant: RAYLEIGH VISION LIMITED, Kowloon (HK)

(72) Inventors: Jr-Hau He, Hsinchu (TW); Chun-Wei Tsai, New Taipei (TW); Zhi-Ting Ye, Miaoli County (TW); Der-Hsien Lien, Taipei (TW); Yuk-Tong Cheng, Kowloon (HK)

(73) Assignee: RAYLEIGH VISION LIMITED, Kowloon (HK)

( * ) Notice: Subject to any disclaimer, the term of this patent is extended or adjusted under 35 U.S.C. 154(b) by 0 days.

(21) Appl. No.: 18/233,343

(22) Filed: Aug. 14, 2023

(51) Int. Cl.
*G09G 3/32* (2016.01)

(52) U.S. Cl.
CPC ....... *G09G 3/32* (2013.01); *G09G 2300/0465* (2013.01)

(58) Field of Classification Search
CPC ............. G09G 3/32; G09G 2300/0465; G09G 3/3225; G09G 3/3233; G09G 2300/0452; G09G 2310/0251; G09G 2310/0262; G02F 1/133601; G02F 1/133603; G02F 1/133514; H10K 59/353; H10K 59/352
See application file for complete search history.

(56) References Cited

U.S. PATENT DOCUMENTS

2020/0043990 A1* 2/2020 Huangfu .............. H10K 59/131
2021/0397045 A1* 12/2021 Hwang ............. G02F 1/133603

* cited by examiner

*Primary Examiner* — Abhishek Sarma
(74) *Attorney, Agent, or Firm* — WPAT, PC

(57) ABSTRACT

A micro light-emitting diode (LED) display is provided. The micro LED display includes a panel, at least one first pixel, and a least one second pixel. The panel is provided with a first display area and a second display area. The first pixel is disposed on the first display area and including a first sub-pixel. The first pixel receives a first control signal. The second pixel which includes a plurality of second sub-pixels is arranged at the second display area and receiving a second control signal. Thereby the display with pixel variation is provided for lower power consumption and reduced manufacturing cost.

12 Claims, 11 Drawing Sheets

MICRO LIGHT EMITTING DIODE DISPLAY

FIELD OF THE INVENTION

The present invention relates to a micro light-emitting diode (LED) display, especially to a micro LED display having changes in pixel density.

BACKGROUND OF THE INVENTION

Micro light-emitting diode (LED) is an emerging display technology consisting of tiny light emitting chips. Compared with LED or OLED (organic light emitting diode) display technology available now, the micro LED provides not only higher brightness, higher contrast ratio, and greater color performance, but also better efficiency and longer lifetime.

The micro LED has huge advantages over other display technologies. First are brightness and contrast. The brightness of micro LED can be up to 10 times of the general OLED and the contrast is also higher. Thereby the micro LED display has significant improvement on color reproduction and image quality.

The second advantage of the micro LED is color performance. Since the micro LED display uses pure light source, it shows a wider color gamut, making colors more real and vivid. At the same time, the micro LED display enables local dimming which means brightness adjustment at individual zones of the same screen. Thereby better contrast ratio and higher efficiency are achieved.

The third advantage is regrading efficiency and longer lifetime. The micro LED uses pure light sources so that backlight and color filter are not required. The light-extraction efficiency is improved.

Owing to the advantages mentioned above, the micro LED has become first choice for many high-end display products including smart phones, tablets, televisions, car dashboard displays, head-mounted displays for virtual reality (VR), augmented reality (AR), and mixed reality (MR).

The head-mounted displays for VR/AR/MR is so close to users' eyes that pixels of the display could be quite large, making gaps between the pixels noticeable. The gaps between the pixels in the display further cause screen door effect. Thereby manufacturers develop displays with better quality and high resolution and the micro LED technology is getting more and more attention. Compared with conventional liquid crystal displays, LED displays, and OLED displays, the micro LED display is considered as the next generation of display technology because of its higher brightness, better contrast ratio, and a wider color space.

The advantages of the micro LED are also reflected in reliability and long-term cost. The micro LED has long lifetime and high durability so that it's more economical than other technologies. Moreover, the micro LED maintains high quality display for a long time because of its low power consumption and long service time.

Although the micro LED with compact size can improve pixel density (resolution) of near-eye displays such as VR, AR, or MR displays, both power consumption and manufacturing cost are increased. The displays with high pixel density have a lower yield rate and response time is increased. Thus there is room for improvement and there is a need to provide a micro LED display which solves the above problems.

In order to solve the problems mentioned above, a micro LED display according to the present invention includes a panel divided into at least two display areas. A pixel of one of the display areas receives a control signal while a plurality of pixels in the other display area receive another control signal,

SUMMARY

Therefore, it is a primary object of the present invention to provide a micro LED display which includes a panel provided with a first display area and a second display area. A first pixel on the first display area includes a sub-pixel for receiving a control signal while a second pixel on the second display area includes a plurality of sub-pixels which receive another control signal simultaneously. The first and the second display areas show images with different resolutions to reduce power consumption of the display.

It is another object of the present invention to provide a micro LED display which includes a panel provided with a first display area and a second display area. A first pixel on the first display area includes a sub-pixel for receiving a control signal while a second pixel on the second display area includes a plurality of sub-pixels which receive another control signal simultaneously. The sub-pixel of the first pixel is controlled by a single control unit and the plurality of sub-pixels of the second pixel is under control of another single control unit to reduce power consumption and manufacturing cost of the display.

In order to achieve the above objects, a micro LED display according to the present invention includes a panel, at least one first pixel, and at least one second pixel. The panel is provided with a first display area and a second display area while the first display area is arranged at one side of the second display area. The first pixel is disposed on the first display area, having a first sub-pixel, and receiving a first control signal. The second pixel is arranged at the second display area, composed of a plurality of second sub-pixels, and receiving a second control signal. The first sub-pixel of the first pixel on the first display area has a first pixel density and the second sub-pixels of the second pixel on the second display area have a second pixel density while the first pixel density is larger than the second pixel density. The above structure reduces both power consumption and manufacturing cost of the micro LED display.

Preferably, the first pixel includes a first control unit which is electrically connected with the first sub-pixel and sending the first control signal to the first sub-pixel.

Preferably, the second pixel includes a second control unit which is electrically connected with the second sub-pixels and sending the second control signal to the second sub-pixels.

Preferably, the panel further includes a column drive circuit and a row drive circuit. Both the column drive circuit and the row drive circuit are electrically connected with the first sub-pixel of the respective first pixels and the second sub-pixels of the respective second pixels for sending the first control signal and the second signal.

Preferably, the respective second sub-pixels of the second pixel show the same image.

Preferably, the panel further includes a drive member which is electrically connected with the column drive circuit and the row drive circuit.

Preferably, the micro LED display further includes a third display area provided with at least one third pixel. The third pixel is disposed on the third display area, including a plurality of third sub-pixels, and receiving a third control signal.

Preferably, the first display area surrounds the third display area while the second display area surrounds the first display area. The first display area, the second display area, and the third display area are respectively corresponding to 5°-30°, 30°~60°, and 0°~5° visual angle/viewing angle. The third sub-pixels of the third pixel on the third display area have a third pixel density which is larger than the second pixel density while the first pixel density is larger than the third pixel density.

Preferably, the first control signal and the second control signal are both a part area of the same image signal. An area of the first control signal is corresponding to the first display area and an area of the second control signal is corresponding to the second display area.

Preferably, a P-type electrode layer and a N-type electrode layer are disposed on the panel. The P-type electrode layer is electrically connected with the first sub-pixel, the second sub-pixels, and the third sub-pixels while the N-type electrode layer is disposed on an outer edge of the panel and electrically connected with the first sub-pixel, the second sub-pixels, and the third sub-pixels. The N-type electrode layer is electrically connected with a N-type electrode layer of another panel at a positioning point which is disposed on the outer edge of the panel. An area of the positioning point of the panel is larger than an area of another positioning point of another panel.

DETAILED DESCRIPTION

In order to learn features and functions of the present invention more clearly, please refer to the following embodiments and detailed descriptions.

In order to solve the problems of the conventional techniques mentioned above, a micro light-emitting diode (LED) display of the present invention is provided. The micro LED display includes a panel provided with a first display area and a second display area. A first pixel on the first display area includes a sub-pixel while a second pixel on the second display area includes a plurality of sub-pixels. The sub-pixel of the first pixel is corresponding to a control signal of a control unit and the plurality of sub-pixels of the second pixel is corresponding to another control signal of another control unit. The display with such structure solves the problems of conventional near-eye displays including greater power consumption and higher production cost.

Figure 1:
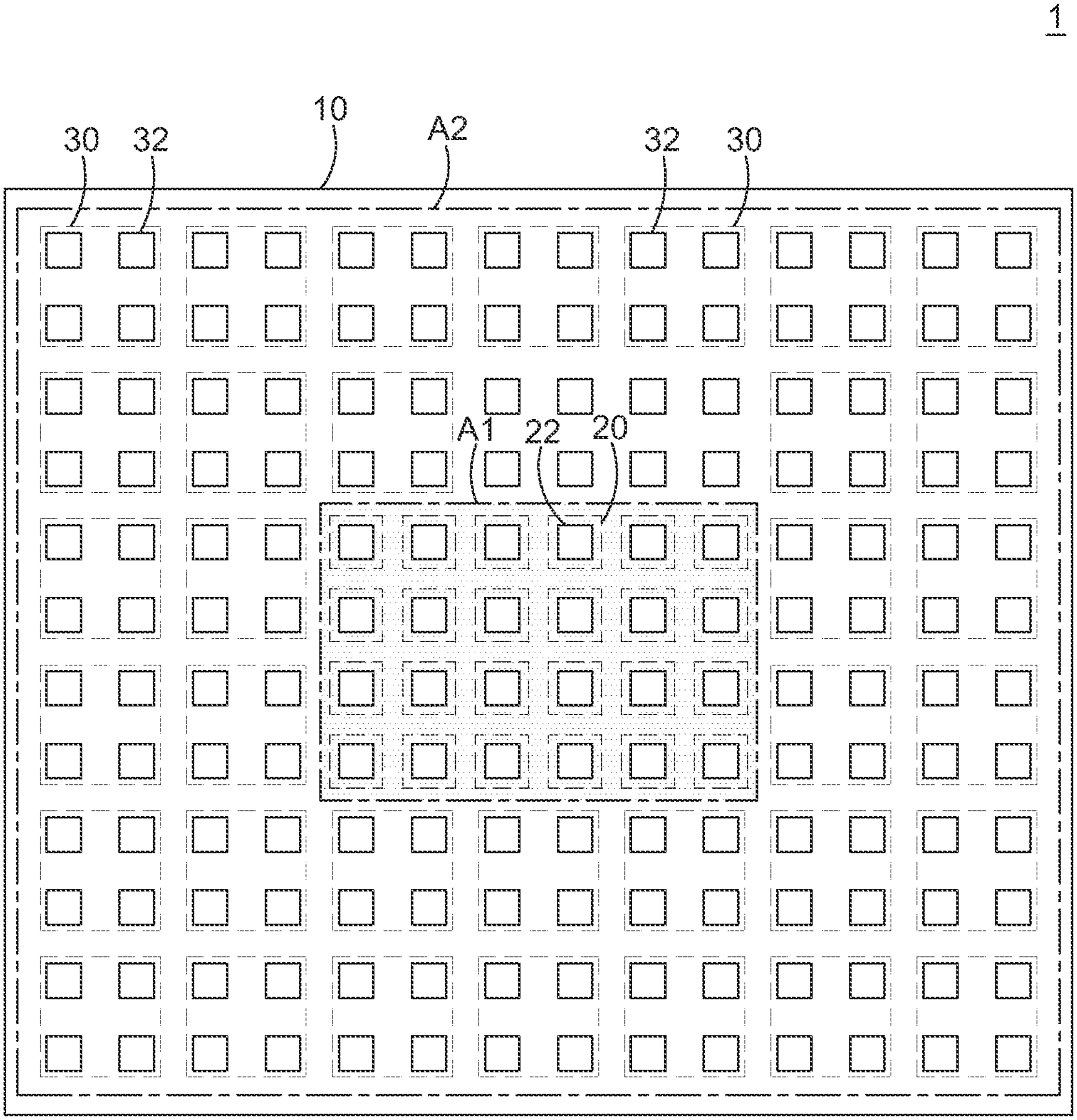
FIG. 1 is a schematic drawing showing a first embodiment according to the present invention.

Refer to FIG. 1, a first embodiment according to the present invention is provided. A micro light emitting diode (LED) display 1 includes a panel 10, a plurality of first pixel 20, and a plurality of second pixel 30 while both the first pixels 20 and the second pixels 30 are disposed on the panel 10.

Still refer to FIG. 1, in this embodiment, the panel 10 is provided with a first display area A1 and a second display area A2 while the first display area A1 is arranged at one side of the second display area A2. That means an edge of the first display area A1 and an edge of the second display area A2 are connected with each other to form a mixed display area. The first pixels 20 are arranged at the first display area A1 and the first pixel 20 which includes a first sub-pixel 22 receives a first control signal. The respective first sub-pixels 22 of the first pixels 20 are spaced apart from one another on the first display area A1. Thereby the plurality of the first sub-pixels 22 is evenly distributed on the first display area A1. The second pixels 30 are disposed on the second display area A2 and each of the second pixels 30 includes a plurality of second sub-pixels 32. The second pixel 30 receives a second control signal. The respective second sub-pixels 32 of the second pixels 30 are spaced apart from one another on the second display area A2. Thereby the plurality of the second sub-pixels 32 is evenly distributed on the second display area A2. The single first sub-pixel 22 receives the single first control signal and emits light to form a pixel on the first display area A1 while the plurality of the second sub-pixels 32 receive the single second control signal and emit light to form another pixel on the second display area A2. Thereby a first resolution shown on the first display area A1 is larger than a second resolution shown on the second display area A2.

In this embodiment, the first control signal and the second control signal are both a part of area of the same image signal. The area of the first control signal is corresponding to the first display area A1 and the area of the second control signal is corresponding to the second display area A2 for corresponding to viewing angles of human eyes.

In this embodiment, there is a plurality of the first pixels 20 spaced apart from one another and disposed on the first display area A1. Similarly, there is also a plurality of the second pixels 30 spaced apart from one another and arranged at the second display area A2.

In this embodiment, the first sub-pixel 22 of the first pixel 20 on the first display area A1 has a first pixel density and the second sub-pixels 32 of the second pixel 30 on the second display area A2 have a second pixel density while the first pixel density is larger than the second pixel density.

In this embodiment, the second display area A2 surrounds the first display area A1 so that the first display area A1 and the second display area A2 are arranged concentrically. And the first display area A1 is located at the center. In a preferred embodiment, the micro LED display 1 is applied to virtual reality (VR) displays, augmented reality (AR) displays, and mixed reality (MR) displays. The first display area A1 is within a horizontal field of view (FOV) and a vertical FOV of human eyes.

In this embodiment, the plurality of the first pixels 20 is disposed on the first display area A1 and the plurality of the second pixels 30 is arranged at the second display area A2, but not limited.

Figure 2:
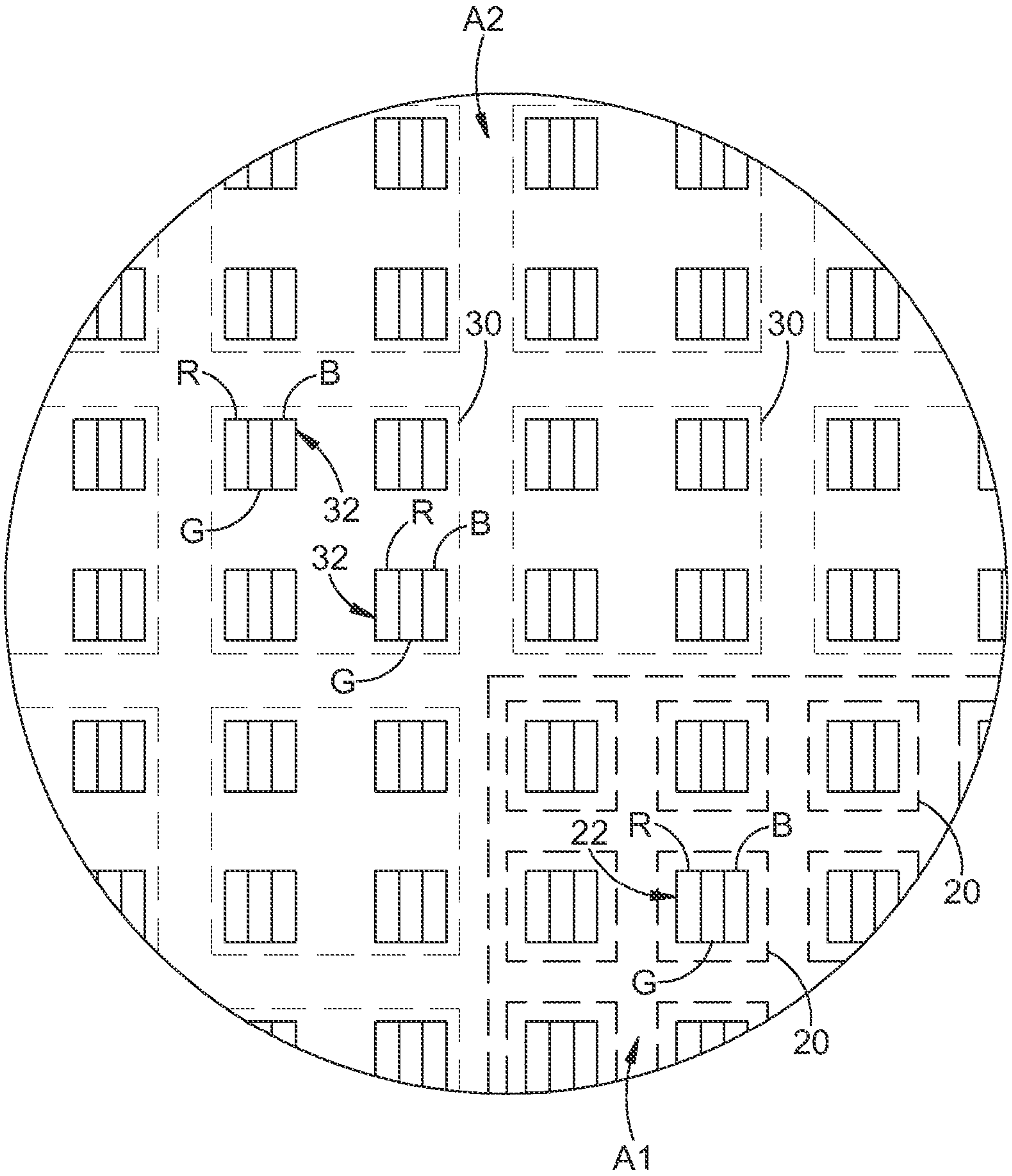
FIG. 2 is a partial enlarged view of a first embodiment according to the present invention.

Refer to FIG. 1 and FIG. 2, in this embodiment, the first sub-pixel 22 of the first pixels 20 includes a red light emitting device R, a green light emitting device G, and a blue light emitting device B for emitting light with different colors (including white light). For example, the red light emitting device R, the green light emitting device G, and the blue light emitting device B respectively can be a red micro light emitting diode (LED), a green micro LED, and a blue micro LED. Each of the second sub-pixels 32 of the second pixel 30 consists of a red light emitting device R, a green light emitting device G, and a blue light emitting device B for emitting light with different colors (including white light). For example, the red light emitting device R, the green light emitting device G, and the blue light emitting device B respectively can be a red micro LED, a green micro LED, and a blue micro LED, but not limited.

Figure 3A:
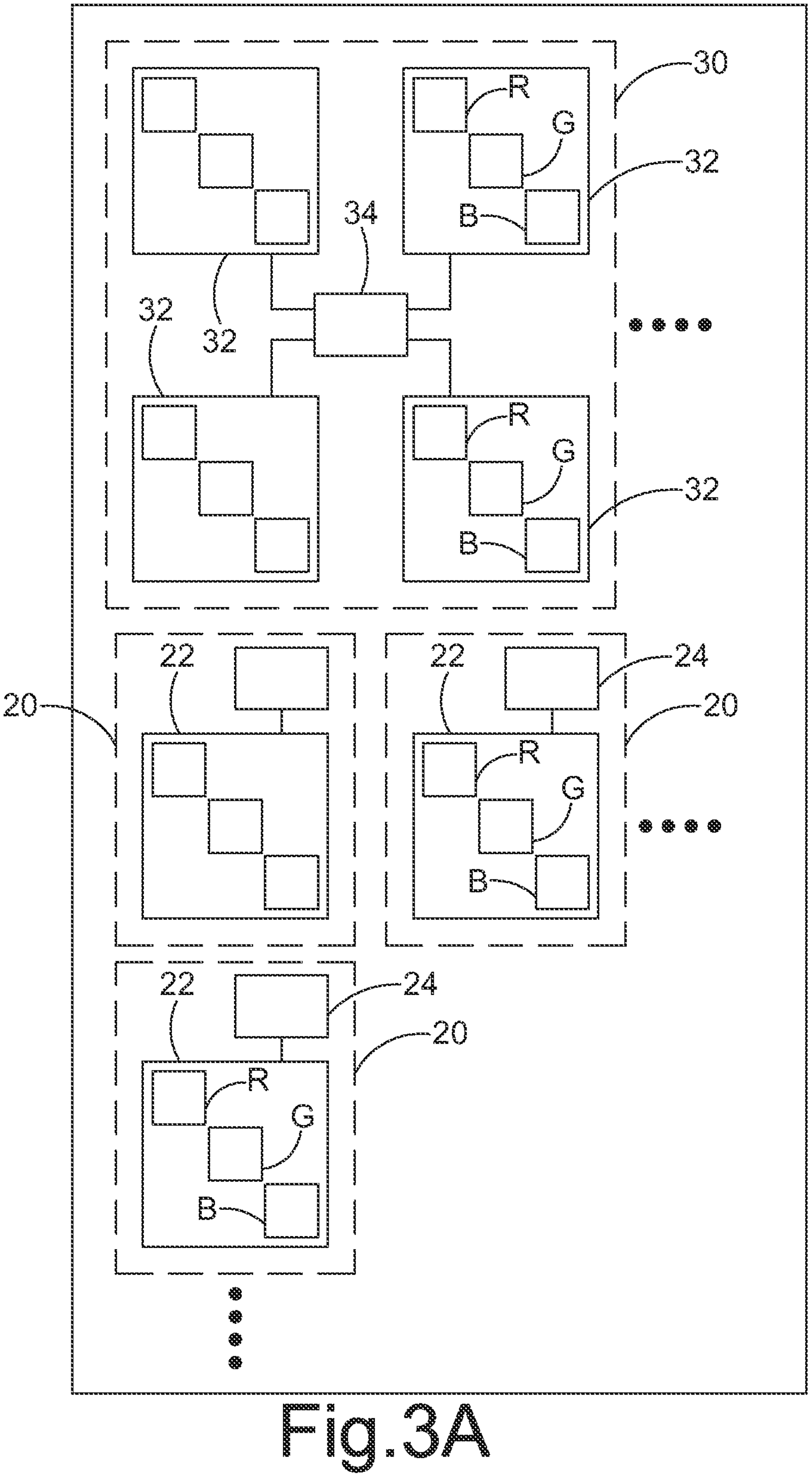
FIG. 3A to FIG. 3B are schematic drawings showing active control of a second embodiment according to the present invention.
Figure 3B:
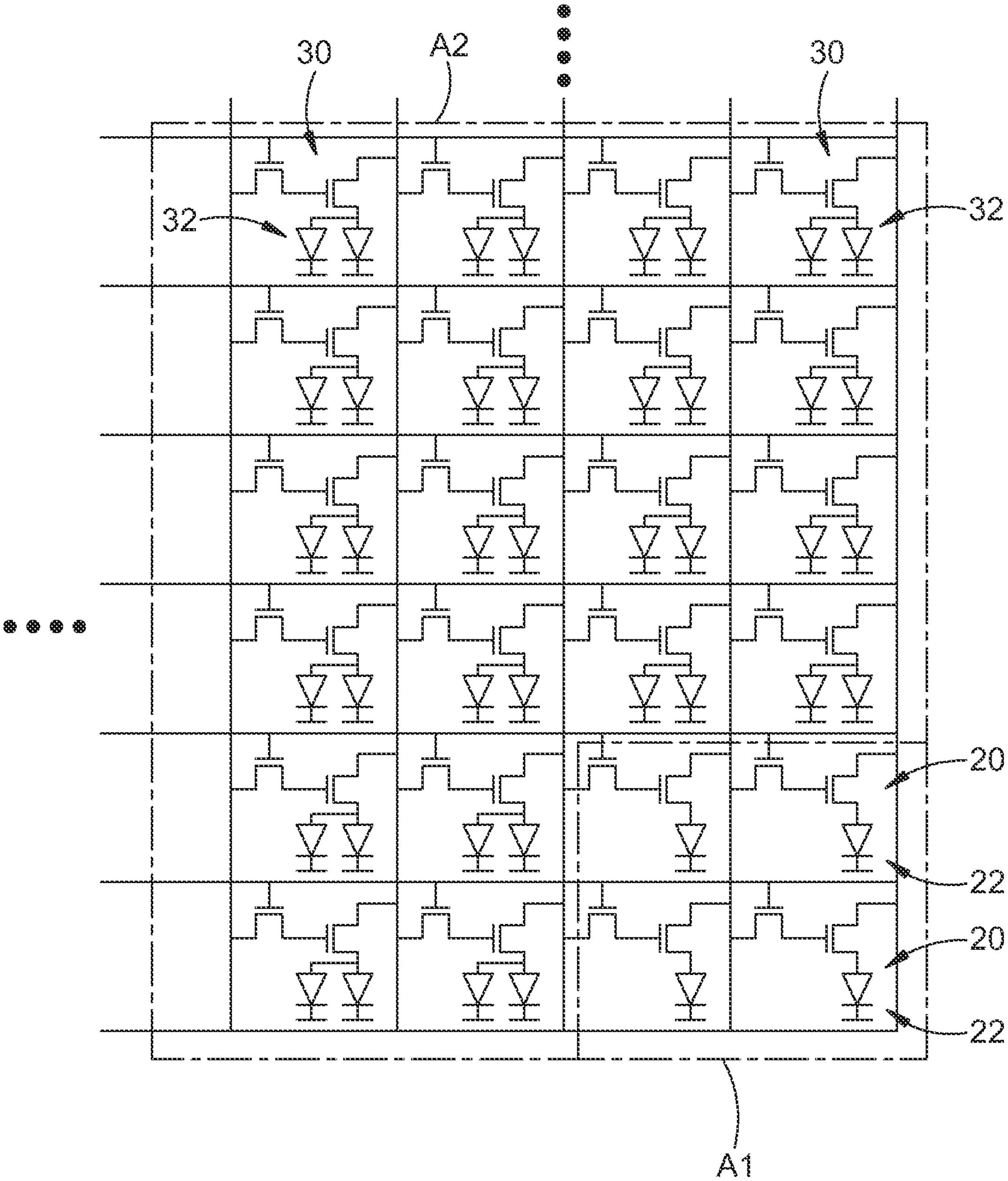

Refer to FIG. 3A and FIG. 3B, schematic drawings showing active control of a second embodiment are provided. As shown in the figures, this is the second embodiment which is formed based on the first embodiment mentioned above. In this embodiment, the first pixel 20 further includes a first control unit 24 which is electrically connected with the first sub-pixel 22 in the first pixel 20 and sending the first control signal to the first sub-pixel 22 for controlling and driving the first sub-pixel 22 to emit light. That means the single first control unit 24 controls the single first sub-pixel 22 correspondingly in the respective first pixels 20.

In this embodiment, each of the second pixels 30 further includes a second control unit 34 which is electrically connected with the second sub-pixels 32 in the second pixel 30 and sending a second control signal to the second sub-pixels 32 for control and driving of the second sub-pixels 32 to emit light. That means the single second control unit 34 controls the plurality of second sub-pixels 32 correspondingly in the respective second pixels 30. The second sub-pixels 32 of the second pixel 30 emit the light with the same wavelength (including white light). That means the second sub-pixels 32 of the second pixel 30 show the same image and form a single pixel.

In this embodiment, the first control unit 24 sends the first control signal to the red light emitting device R, the green light emitting device G, and the blue light emitting device B of the first sub-pixel 22 for controlling and driving the first sub-pixel 22 to emit light with different colors (including white light).

In this embodiment, the second control unit 34 sends the second control signal to the red light emitting device R, the green light emitting device G, and the blue light emitting device B of the respective second sub-pixels 32 at the same time for controlling and driving the second sub-pixels 32 to emit light with different colors (including white light).

In this embodiment, the single second control unit 34 controls the second sub-pixels 32 at the same time so that the number of control units on the second display area A2 can be reduced. Thereby manufacturing cost of the micro LED display 1 is further lowered and a yield rate of the micro LED display 1 is improved.

In this embodiment, the first control unit 24 and the second control unit 34 drives the sub-pixels by active matrix. For example, a transistor array on a back panel of the micro LED display is used to control on/off of current and drive pixels. The first control unit 24 and the second control unit 34 can be silicon transistors, or thin-film transistors (TFT). The silicon transistor can be made quite tiny and transistors on the back panel produced have fine pitch, able to be applied to VR, AR, MR displays with high resolution. As to the TFT, it can be can be made of low-temperature polycrystalline silicon (LTPS) or indium gallium zinc oxide (IGZO). The TFT is produced on a substrate with larger size than a substrate for silicon transistors. Thus the cost per unit area is further reduced.

Figure 4A:
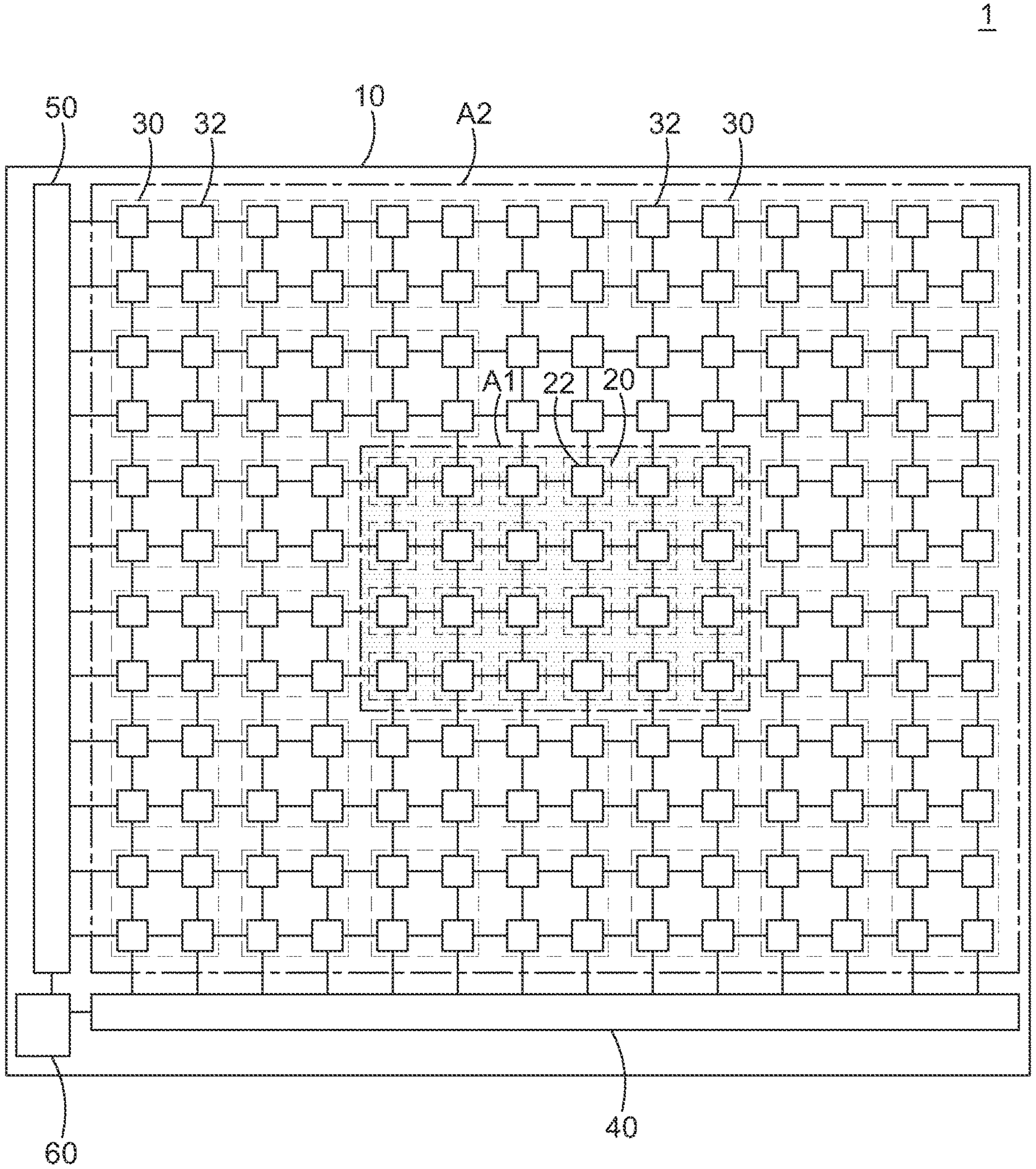
FIG. 4A and FIG. 4B are schematic drawings showing passive control of a third embodiment according to the present invention.
Figure 4B:
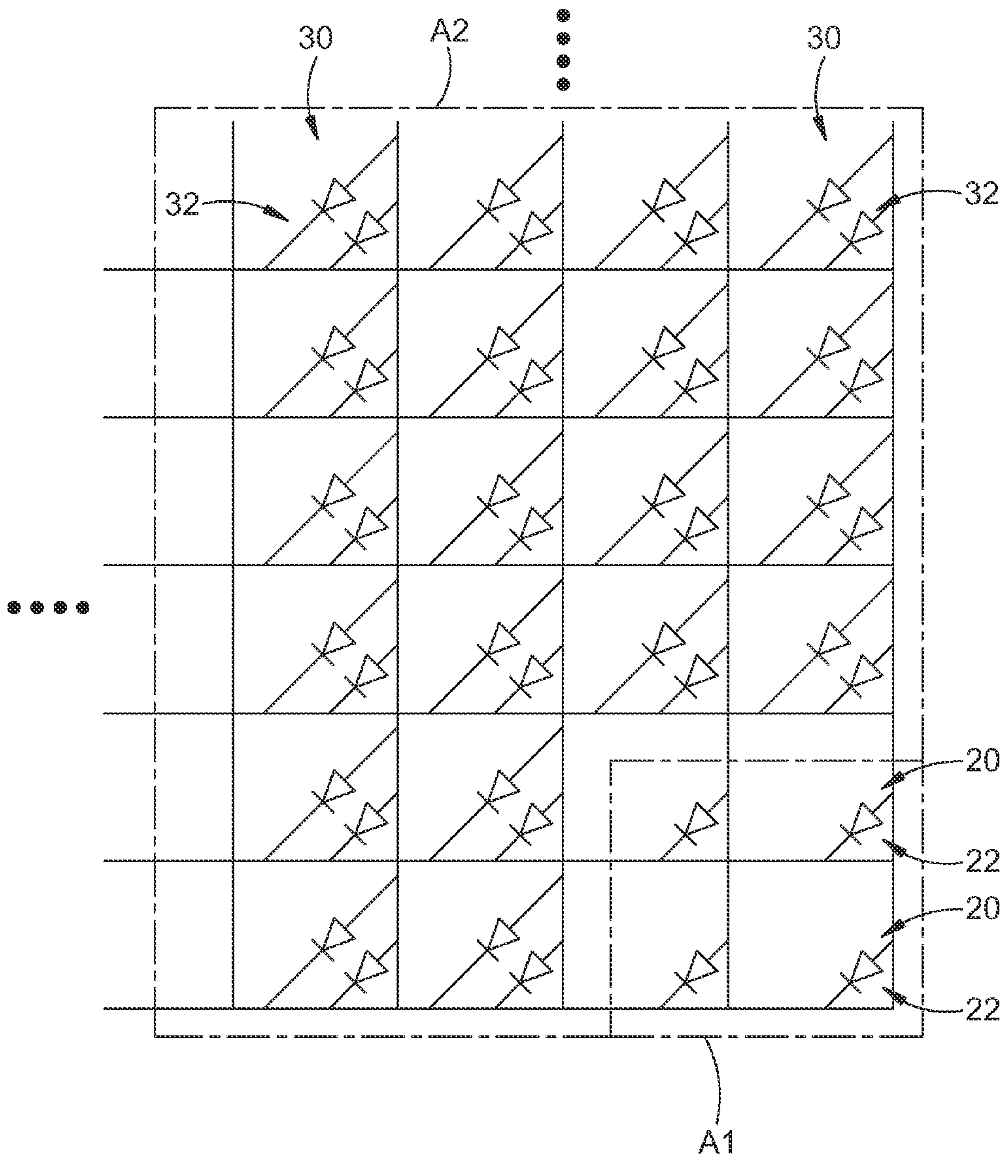

Refer to FIG. 4A and FIG. 4B, schematic drawings showing passive control of a third embodiment are provided. As shown in the figures, this is the third embodiment which is formed based on the first embodiment mentioned above. In this embodiment, the panel 10 further includes a column drive circuit 50 and a row drive circuit 52. The column drive circuit 50 is electrically connected with the first sub-pixel 22 of the respective first pixels 20 and the second sub-pixels 32 of the respective second pixels 30. The row drive circuit 52 is electrically connected with the first sub-pixel 22 of the respective first pixels 20 and the second sub-pixels 32 of the respective second pixels 30. The column drive circuit 50 and the row drive circuit 52 send the first control signal to the first sub-pixel 22 included in the respective first pixel 20. The column drive circuit 50 and the row drive circuit 52 send the second signal to the second sub-pixels 32 included in the respective second pixel 30.

In this embodiment, the second sub-pixels 32 of the respective second pixel 30 receives the same control signal at the same time so that the amount of drive circuit used on the second display area A2 is reduced and circuit layout area is also decreased. Thereby manufacturing cost of the micro LED display 1 is further reduced and a yield rate of the of the micro LED display 1 is increased.

In this embodiment, passive matrix is used. In an array, a P-electrode of each row of pixels is connected to a row data current source while a N-electrode of each column of pixels is connected to a column scan line for control of the first sub-pixel 22 of the respective first pixels 20 and the second sub-pixels 32 of the respective second pixels 30 to emit light. By the second control signal, the second sub-pixels 32 of the respective second pixels 30 remit the light with the same wavelength (including white light).

In this embodiment, the panel 10 further includes a drive member 60 which is electrically connected with the column drive circuit 50 and the row drive circuit 52 for transmission of the first control signal and the second control signal.

Figure 5:
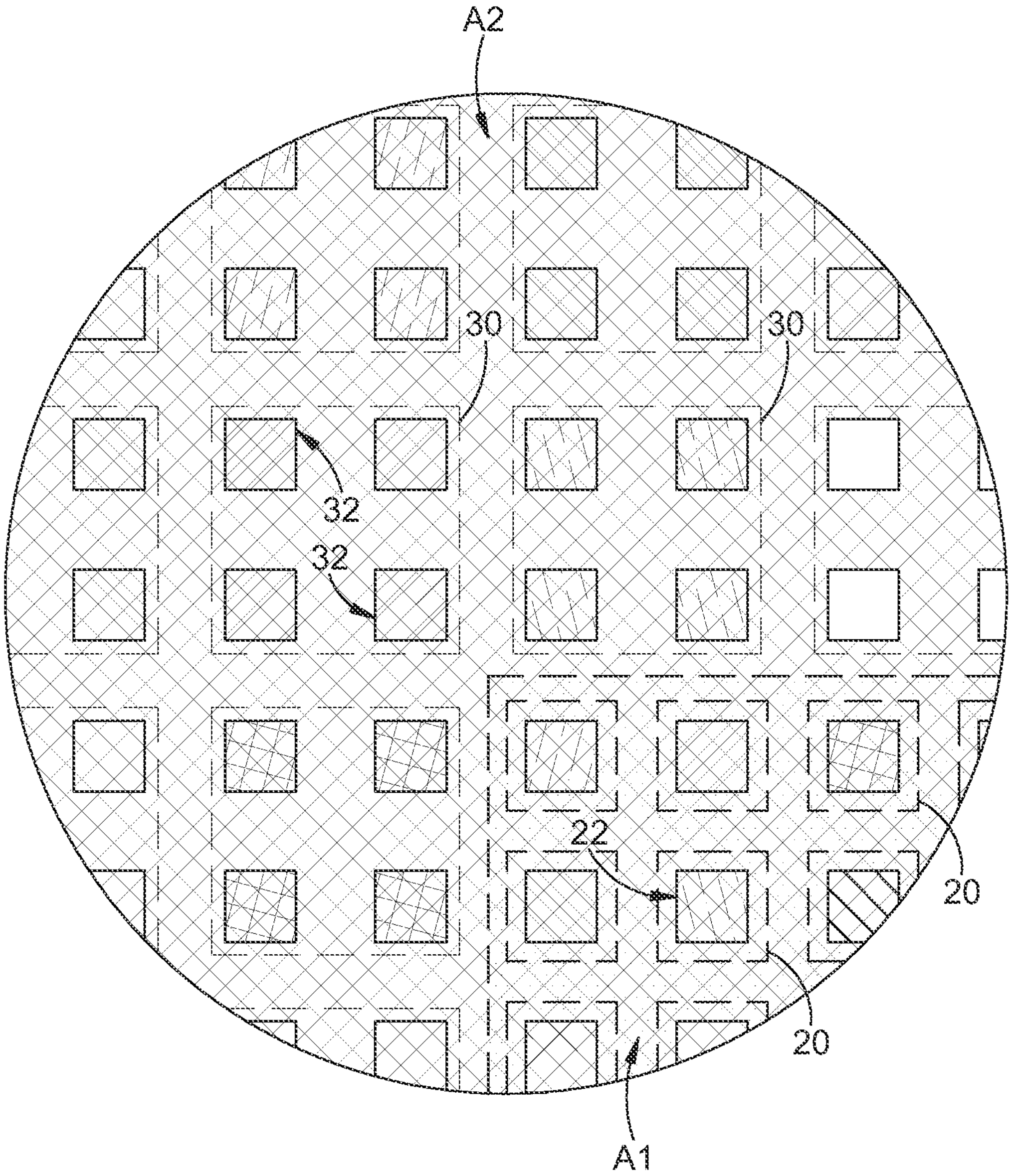
FIG. 5 is a schematic drawing showing light emitting of an embodiment according to the present invention.

Refer to FIG. 5, a schematic drawing showing light emitting of an embodiment is provided. As shown in the figure, the embodiment can be one of the three embodiments mentioned above. The respective first pixels 20 on the first display area A1 can emit different light and generate a plurality of pixel points. Similarly, the respective second pixels 30 on the second display area A2 can also emit different light and generate a plurality of pixel points. It should be noted that the second pixel 30 includes a plurality of second sub-pixels 32 which are combined to form one pixel point. Thus a second resolution of an image shown on the second display area A2 is smaller than a first resolution of an image shown on the first display area A1. The second display area A2 is corresponding to an area where human eyes provide poor judgement so that power consumption of the second display area A2 with lower resolution is further reduced. Moreover, the second display area A2 with lower demand for the control units (such as the second and the third embodiments) can also reduce manufacturing cost of the micro LED display 1.

Figure 6:
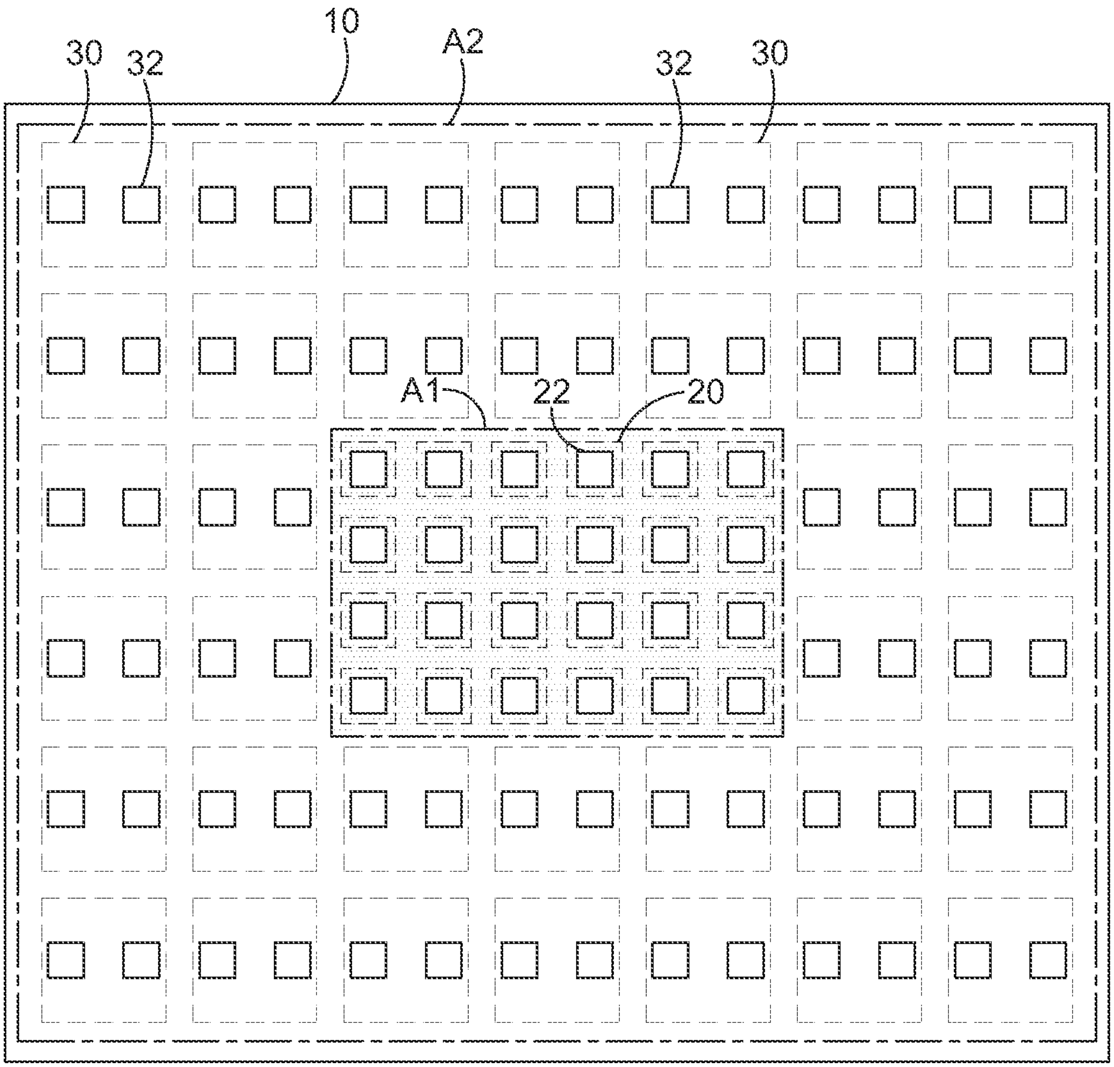
FIG. 6 is a schematic drawing showing pixel densities of an embodiment according to the present invention.

Refer to FIG. 6, a schematic drawing showing pixel densities of an embodiment according to the present invention is provided. This embodiment can correspond to the above first, the second and the third embodiments. In this embodiment, the first sub-pixel 22 of the first pixel 20 on the first display area A1 has a first pixel density while the second sub-pixels 32 of the second pixel 30 on the second display area A2 has a second pixel density. The first pixel density is larger than the second pixel density. That means an interval between the adjacent two second sub-pixels 32 distributed on the second display area A2 is larger than an interval between the two adjacent first sub-pixels 22 distributed on the first display area A1. The above structure further reduces the amount of light emitting devices used on the second display area A2. Thereby the manufacturing cost is decreased and a yield rate of the display is raised.

Figure 7:
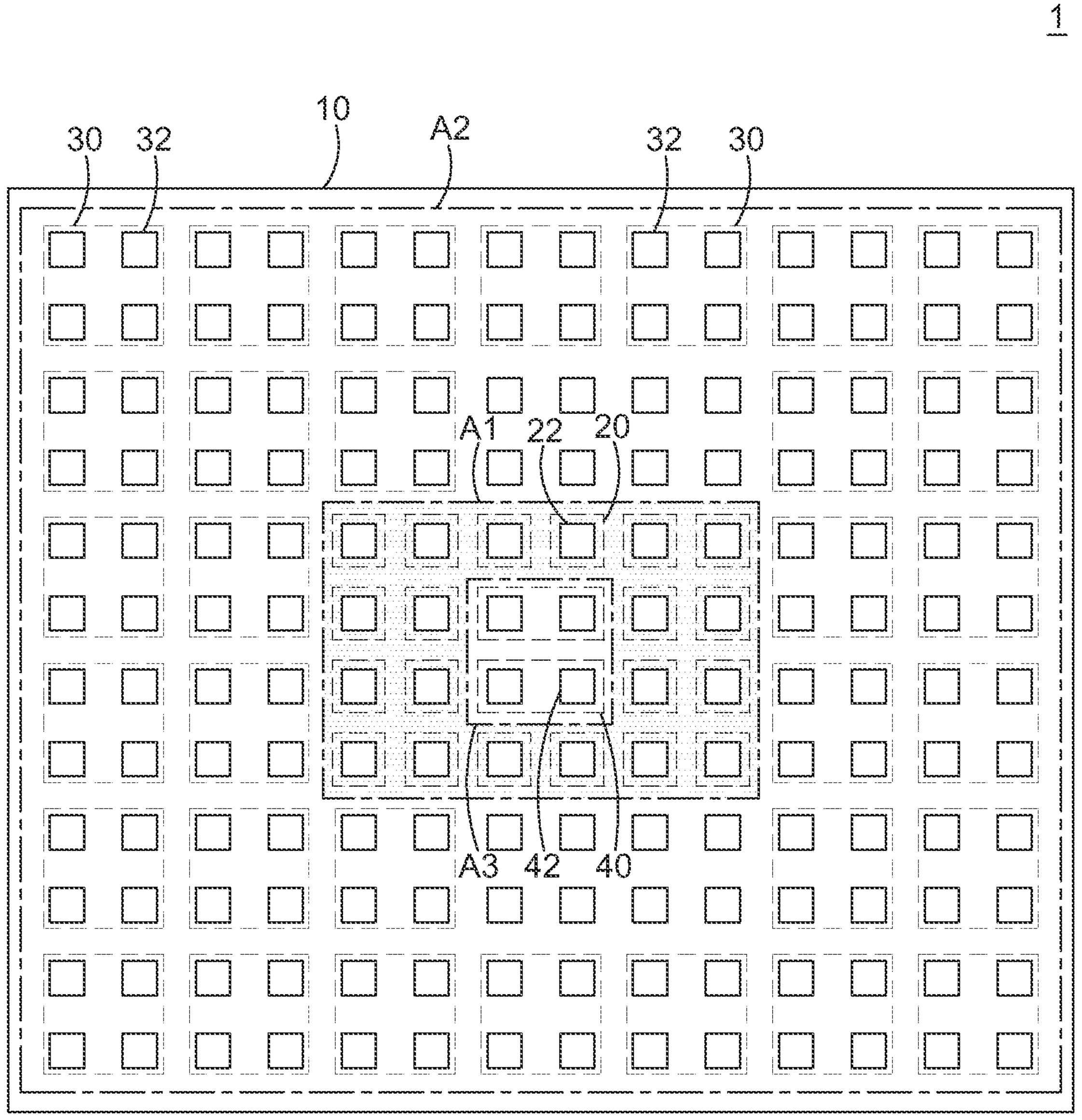
FIG. 7 is a schematic drawing showing a third display area of an embodiment according to the present invention.

Refer to FIG. 7, a schematic drawing showing a third display area of an embodiment according to the present invention is provided. As shown in the figure, the micro LED display 1 further includes a third display area A3 on which at least one third pixel 40 is disposed. That means the third pixel 40 is arranged at the third display area A3, including a plurality of third sub-pixels 42, and receiving a third control signal. The rest components of this embodiment are the same as those of the first embodiment mentioned above.

In this embodiment, the first display area A1 surrounds the third display area A3 while the second display area A2 surrounds the first display area A1. The first display area A1, the second display area A2, and the third display area A3 are respectively corresponding to 5°-30°, 30°~60°, and 0°~5° viewing angle of human eyes. The third sub-pixels 42 of the third pixel 40 on the third display area A3 have a third pixel density which is larger than the second pixel density while the first pixel density is larger than the third pixel density. Thereby the pixel density is in a sparse-dense-sparse pattern from a periphery to a center point of the panel 10 and the design is not only for adaptation of human eyes' viewing angles but also for reduction of manufacturing cost of the panel 10.

The maximum horizontal viewing angle of both eyes is 188 degrees and a person's field of vision overlaps at 124 degrees for both eyes. That means within certain range human eyes can see, users only have stereoscopic vision for objects within the 124°. A central axis from fixation points of eyes to the middle of the eyes is defined as 0°. A visual angle of the left and right sides of the human eyes is 62° and −62°. The comfortable field of vision of one eye is −30°~30° degrees. Objects within this range of 60° can be seen clearly and focused. A peripheral zone out of the viewpoint about 30° (or −30°) is called peripheral vision (out of the corner of the eyes). That's the area the eyes are not so sensitive to and unable to see things clearly. Thus in the above embodiment, the first display area A1 with the highest pixel density is corresponding to 5°~30° viewing angle of human eyes while the second display area A2 with the lowest pixel density is corresponding to 30°~60° viewing angle of human eyes. Thereby both manufacturing cost and energy consumption of the display can be reduced.

While being applied to near-eye displays, the panel 10 of the display has an area between the eyes (in front of the nose bridge) which users are unable to see clearly. Thereby the above embodiment is further provided with the third display area A3 with the second lowest pixel density and corresponding to 0°~5° viewing angle of the eyes in order to reduce manufacturing cost and power consumption of the display.

Figure 8A:
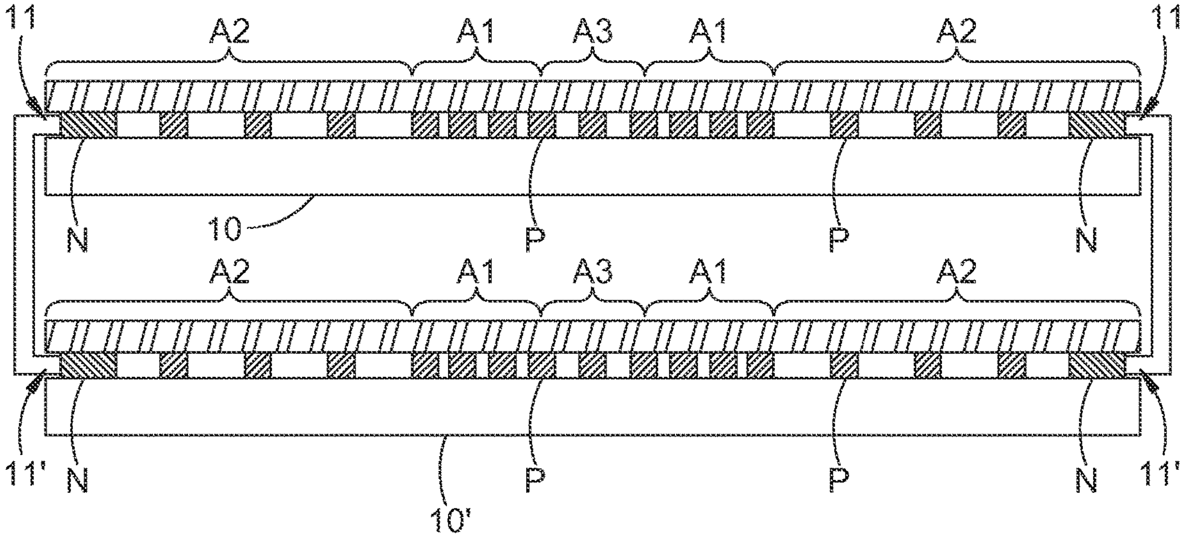
FIG. 8A and FIG. 8B are schematic drawings showing a multi-layer panel of an embodiment according to the present invention.
Figure 8B:
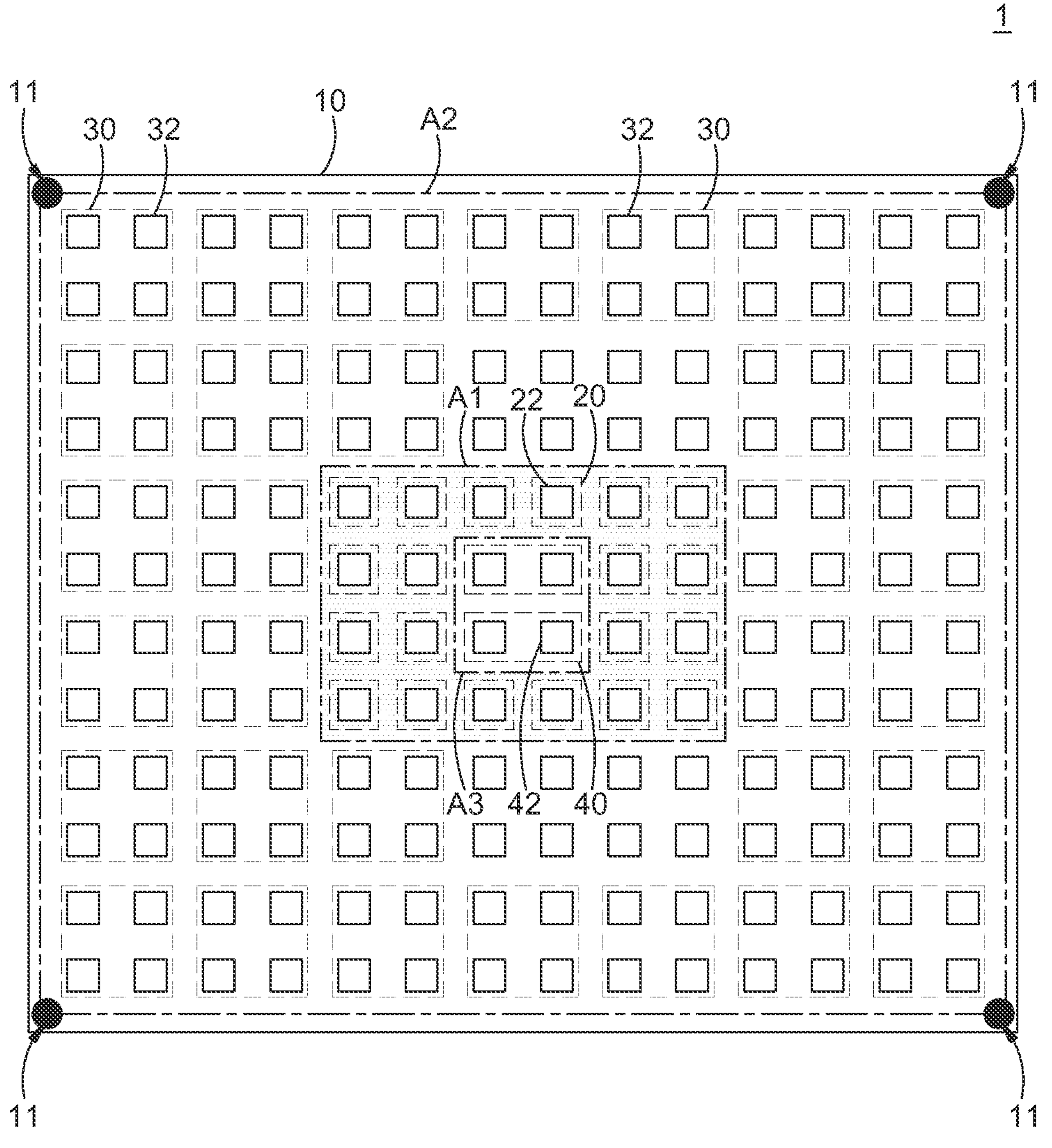

Refer to FIG. 8A and FIG. 8B, a multi-layer panel of an embodiment of the present invention is provided. As shown in the figures, this embodiment is based on the first embodiment mentioned above. In this embodiment, the display further includes a third display area A3 at which at least one third pixel 40 is arranged. The third pixel 40 is composed of a plurality of third subpixels 42 and receiving a third control signal. A P-type electrode layer P and a N-type electrode layer N are disposed on the panel 10. The P-type electrode layer P is electrically connected with the first sub-pixel 22, the second sub-pixels 32, and the third sub-pixels 42 while the N-type electrode layer N is disposed on an outer edge of the panel 10 and electrically connected with the first sub-pixel 22, the second sub-pixels 32, and the third sub-pixels 42. In this embodiment, the micro LED display 1 includes a plurality layers of the panels 10, 10' and the N-type electrode layer N of the panel 10 is electrically connected with another N-type electrode layer N of another panel 10' at a positioning point 11. That means the N-type electrode layer N at the positioning point 11 of the panel 10 is electrically connected with the N-type electrode layer N at another positioning point 11' of the panel 10' so that the panel 10 and the panel 10' are stacked to form the display panel with vertically stacked light emitting devices. The rest components of this embodiment are the same as those of the first embodiment mentioned above and are not described in details.

In this embodiment, the N-type electrode layer N of the panel 10 is electrically connected with the N-type electrode layer N of the panel 10' by fan-out packaging.

In this embodiment, the positioning point 11 of the panel 10 is arranged at the outer edge of the panel 10, but not limited.

In this embodiment, an area of the positioning point 11 of the panel 10 is larger than an area of the positioning point 11' of the panel 10'. That means the positioning point 11' is also disposed on an outer edge of the panel 10' under the panel 10 and the area of the positioning point 11' of the panel 10' should be smaller than the area of the positioning point 11 of the panel 10. After the two panels 10, 10' being stacked, the positioning points 11, 11' located at upper side and lower side are easier to be found and the N-type electrode layers N can be electrically connected by wires. Thereby a problem of difficulty in positioning can be solved.

In a preferred embodiment, the number of the layers of the stacked panels 10, 10' is not limited to two. The layers stacked can be three layers or multiple layers.

In summary, in the micro LED display according to the present invention, the number of control units in a part of area of the panel (the second display area) is reduced or resolution of a part of area of the panel is controlled by location-selection signal for reduction of the resolution while that part of area is corresponding to an area where the eyes sees things without focusing (such as peripheral vision). The power consumption of the display is further reduced and so is the manufacturing cost of the display. Moreover, fewer control units or wires are used at the panel of the display so that yield rate of the display is improved and response time of images is reduced. The micro LED display the above structure can solve the problems of the conventional near-eye displays including greater energy consumption and higher manufacturing cost.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

The invention claimed is:

1. A micro light emitting diode (LED) display comprising:

a panel which is provided with a first display area and a second display area while the first display area is arranged at one side of the second display area;

a plurality of first pixels which are disposed on the first display area, each of the first pixels having a first sub-pixel, and the first sub-pixel receiving a first control signal, the first sub-pixels of the first pixels including a plurality of first light emitting devices controlled by the first control signal; and a plurality of second pixels which are arranged at the second display area, composed of a plurality of second sub-pixels, and the second sub-pixels receiving a second control signal, the second sub-pixels including a plurality of second light emitting devices controlled by the second control signal;

wherein the first sub-pixels of the first pixels on the first display area has a first pixel density and the second sub-pixels of the second pixels on the second display area have a second pixel density while the first pixel density is larger than the second pixel density, and an interval between two adjacent second sub-pixels of the second sub-pixels distributed on the second display area is larger than an interval between two adjacent first sub-pixels of the respective first sub-pixels distributed on the first display area.

2. The micro LED display as claimed in claim 1, wherein each of the first pixels includes a first control unit which is electrically connected with the first sub-pixel in each of the first pixels and sending the first control signal to the first sub-pixel in each of the first pixels for controlling the first light emitting devices.

3. The micro LED display as claimed in claim 1, wherein each of the second pixels includes a second control unit which is electrically connected with the second sub-pixels in each of the second pixels and sending the second control signal to the second sub-pixels in each of the second pixels for controlling the second light emitting devices.

4. The micro LED display as claimed in claim 1, wherein the panel further includes a column drive circuit and a row drive circuit; both the column drive circuit and the row drive circuit are electrically connected with the first sub-pixel of the first pixel and the second sub-pixels of the second pixel for sending the first control signal and the second signal.

5. The micro LED display as claimed in claim 4, wherein the second sub-pixels of the second pixel show the same image.

6. The micro LED display as claimed in claim 4, wherein the panel further includes a drive member which is electrically connected with the column drive circuit and the row drive circuit.

7. The micro LED display as claimed in claim 1, wherein the micro LED display further includes a third display area provided with at least one third pixel which is disposed on the third display area, including a plurality of third sub-pixels, and receiving a third control signal.

8. The micro LED display as claimed in claim 7, wherein the first display area surrounds the third display area while the second display area surrounds the first display area; the first display area, the second display area, and the third display area are respectively corresponding to 5°-30°, 30°~60°, and 0°~5° viewing angle; the third sub-pixels of the third pixel on the third display area have a third pixel density which is larger than the second pixel density while the first pixel density is larger than the third pixel density.

9. The micro LED display as claimed in claim 1, wherein the first control signal and the second control signal are corresponding to an image signal.

10. The micro LED display as claimed in claim 8, wherein a P-type electrode layer and a N-type electrode layer are disposed on the panel; the P-type electrode layer is electrically connected with the first sub-pixel, the second sub-pixels, and the third sub-pixels correspondingly while the N-type electrode layer is disposed on an outer edge of the panel and electrically connected with the first sub-pixel, the second sub-pixels, and the third sub-pixels correspondingly; the N-type electrode layer is electrically connected with a N-type electrode layer of another panel at a positioning point which is disposed on an outer edge of the panel; an area of the positioning point of the panel is larger than an area of another positioning point of the another panel.

11. The micro LED display as claimed in claim 1, wherein the first light emitting devices include red, green, blue light emitting devices, and emitting light with different colors controlled by the respective first control signals.

12. The micro LED display as claimed in claim 1, wherein the second light emitting devices include red, green, blue light emitting devices, and emitting light with different colors controlled by the second control signals.

* * * * *